US012762735B2

(12) United States Patent
Wang et al.

(10) Patent No.: US 12,762,735 B2
(45) Date of Patent: Oct. 13, 2026

(54) ENHANCED TECHNIQUES FOR REAL-TIME MULTI-PERSON THREE-DIMENSIONAL POSE TRACKING USING A SINGLE CAMERA

(71) Applicant: INTEL CORPORATION, Santa Clara, CA (US)

(72) Inventors: Shandong Wang, Beijing (CN); Yurong Chen, Beijing (CN); Ming Lu, Beijing (CN); Li Xu, Shanghai (CN); Anbang Yao, Beijing (CN)

(73) Assignee: Intel Corporation, Santa Clara, CA (US)

(*) Notice: Subject to any disclaimer, the term of this patent is extended or adjusted under 35 U.S.C. 154(b) by 159 days.

(21) Appl. No.: 18/569,996

(22) PCT Filed: Dec. 10, 2021

(86) PCT No.: PCT/CN2021/136987
§ 371 (c)(1),
(2) Date: Dec. 13, 2023

(87) PCT Pub. No.: WO2023/102873
PCT Pub. Date: Jun. 15, 2023

(65) Prior Publication Data

US 2024/0312055 A1 Sep. 19, 2024

(51) Int. Cl.
*G06T 17/00* (2006.01)
*G06T 7/246* (2017.01)
(Continued)

(52) U.S. Cl.
CPC .................. *G06T 7/74* (2017.01); *G06T 7/80* (2017.01); *G06T 2207/20084* (2013.01); *G06T 2207/30196* (2013.01); *G06T 2207/30221* (2013.01)

(58) Field of Classification Search
CPC ... G06T 7/74; G06T 7/80; G06T 2207/20084; G06T 2207/30196; G06T 2207/30221;
(Continued)

(56) References Cited

U.S. PATENT DOCUMENTS 10,839,203 B1 * 11/2020 Guigues .................. G06T 7/292
11,182,924 B1 * 11/2021 Akbas ....................... G06T 7/73
(Continued)

FOREIGN PATENT DOCUMENTS

CN 107886089 A 4/2018
CN 109087329 A 12/2018
(Continued)

OTHER PUBLICATIONS

Shimada, S., Golyanik, V., Xu, W., & Theobalt, C. (2020). PHYSCAP. ACM Transactions on Graphics, 39(6), 1-16. https://doi.org/10.1145/3414685.3417877 (Year: 2020).*
(Continued)

*Primary Examiner* — John Villecco
*Assistant Examiner* — Kyla Guan-Ping Tiao Allen
(74) *Attorney, Agent, or Firm* — Hanley, Flight & Zimmerman, LLC

(57) ABSTRACT

This disclosure describes systems, methods, and devices related to real-time multi-person three-dimensional pose tracking using a single camera. A method may include receiving, by a device, two-dimensional image data from a camera, the two-dimensional image data representing a first person and a second person; generating, based on the two-dimensional image data, two-dimensional positions of body parts represented by the first person; generating, using a deep neural network, based on the two-dimensional positions, a three-dimensional pose regression of the body parts represented by the first person; identifying, based on the two-dimensional positions and the three-dimensional pose
(Continued)

regression, contact between a ground plane and a foot of the first person; generating an absolute three-dimensional position of the contact between the ground plane and the foot of the first person; generating, based on the absolute three-dimensional position, a three-dimensional pose of the body parts represented by the first person.

16 Claims, 10 Drawing Sheets

(51) Int. Cl.
*G06T 7/73* (2017.01)
*G06T 7/80* (2017.01)

(58) Field of Classification Search
CPC .......... G06T 2207/30241; G06T 7/246; G06T 7/277; G06T 7/75; G06T 2207/30204; G06T 7/55; G06T 2207/20076; G06T 17/00
See application file for complete search history.

(56) References Cited

U.S. PATENT DOCUMENTS

| | | | | |
|---|---|---|---|---|
| 2018/0075593 | A1* | 3/2018 | Wang | G06V 40/103 |
| 2019/0278983 | A1* | 9/2019 | Iqbal | G06V 10/82 |
| 2021/0192783 | A1* | 6/2021 | Huelsdunk | G06T 7/75 |
| 2021/0248772 | A1 | 8/2021 | Iqbal et al. | |

FOREIGN PATENT DOCUMENTS

| | | | | |
|---|---|---|---|---|
| CN | 112837362 | A | 5/2021 | |
| CN | 113033369 | A * | 6/2021 | G06F 18/2411 |
| CN | 113255420 | A | 8/2021 | |
| WO | 2021212411 | A1 | 10/2021 | |

OTHER PUBLICATIONS

Dabral et al., “Multi-Person 3D Human Pose Estimation from Monocular Images,” 3DV, Sep. 24, 2019, 10 pages.
Mehta et al., “VNect: Real-time 3D Human Pose Estimation with a Single RGB Camera,” Siggraph 2017, May 3, 2017, 13 pages.
Mehta et al., “XNect: Real-time Multi-Person 3D Motion Capture with a Single RGB Camera,” ACM Trans. Graph, vol. 39, No. 3, Jul. 2020, 24 pages.
Moon et al., “Camera Distance-aware Top-down Approach for 3D Multi-person Pose Estimation from a Single RGB Image,” ICCV, 2019, 10 pages.
Ionescu et al., “Human3.6M,” retrieved from http://vision.imar.ro/human3.6m/description.php on Aug. 2, 2024, 1 page.
Chang et al., “AbsPoseLifter: Absolute 3D Human Pose Lifting Network from a Single Noisy 2D Human Pose,” arXiv, Oct. 26, 2019, 15 pages.
Zhen et al., “SMAP: Single-Shot Multi-Person Absolute 3D Pose Estimation,” ECCV 2020, Aug. 26, 2020, 20 pages.
International Searching Authority, “International Preliminary Report on Patentability,” issued in connection with International Application No. PCT/CN2021/136987, mailed on Jun. 20, 2024, 5 pages.
Ionescu et al., “Latent Structured Models for Human Pose Estimation,” IEEE International Conference on Computer Vision (ICCV), Nov. 2011, 8 pages.
Ionescu et al., “Human3.6M: Large Scale Datasets and Predictive Methods for 3D Human Sensing in Natural Environments,” IEEE Transactions on Pattern Analysis and Machine Intelligence, 2014, 15 pages.
International Search Report and Written Opinion mailed Aug. 29, 2022 in International Application No. PCT/CN2021/136987, 9 pages.

* cited by examiner

ENHANCED TECHNIQUES FOR REAL-TIME MULTI-PERSON THREE-DIMENSIONAL POSE TRACKING USING A SINGLE CAMERA

CROSS-REFERENCE TO RELATED APPLICATION(S)

This application is a U.S. National Stage Application under 35 U.S.C. 371 and claims the priority benefit of International Application No. PCT/CN2021/136987, filed Dec. 10, 2021, the disclosure of which is incorporated herein by reference as if set forth in full.

TECHNICAL FIELD

This disclosure generally relates to systems and methods for video processing and, more particularly, to real-time multi-person absolute three-dimensional pose tracking using a single camera.

BACKGROUND

Three-dimensional human pose tracking from a single camera may be difficult. In particular, transforming two-dimensional image data of a single camera into three-dimensional image data may be challenging due to depth ambiguities, occlusions, and significant variations of appearances and scenes.

DETAILED DESCRIPTION

Figure 1:
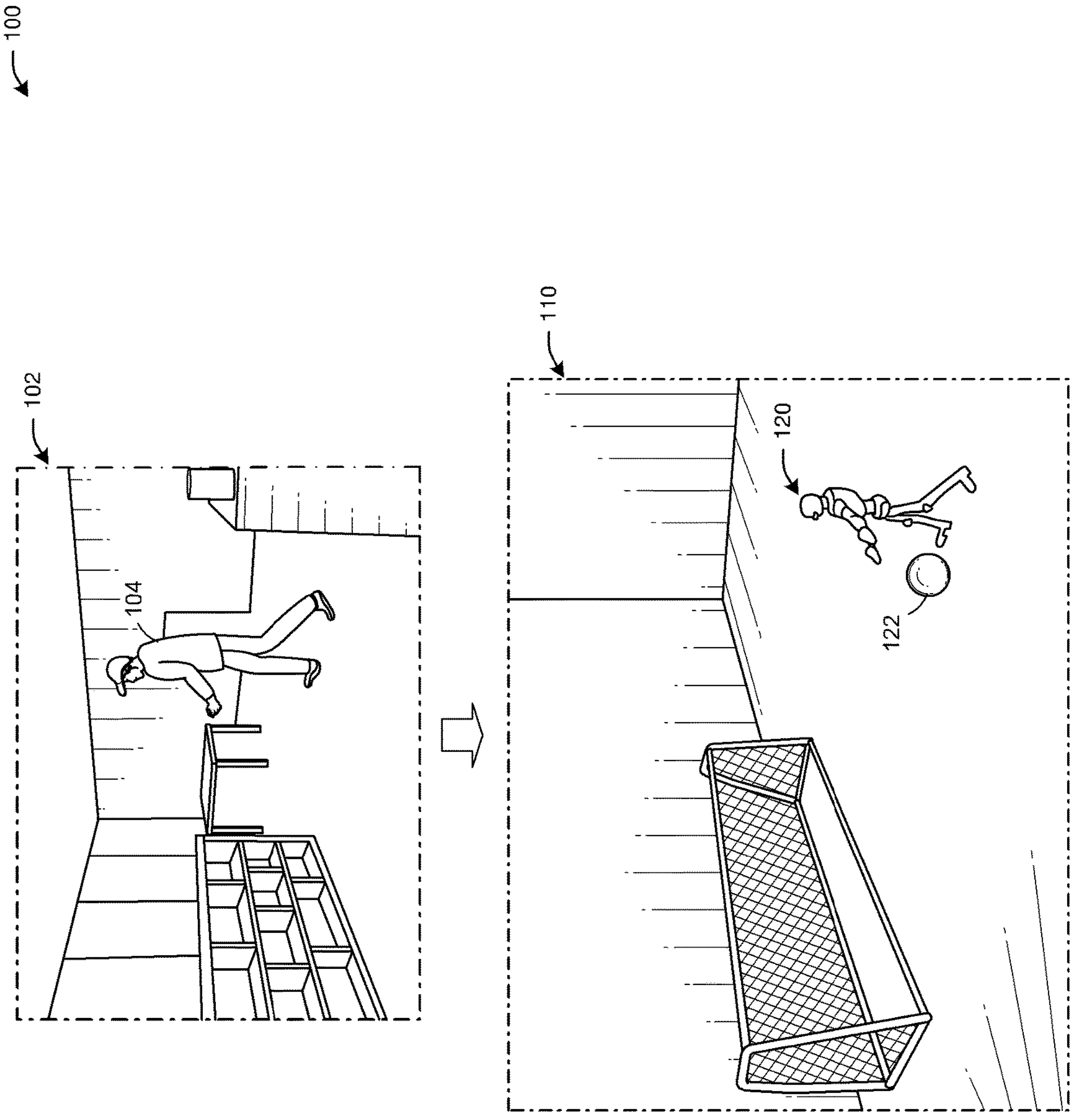
FIG. 1 shows an example process of tracking two-dimensional image data representing a body pose to generate a three-dimensional virtual representation of the body pose, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A single RGB (red, green, blue) camera may capture two-dimensional (2D) images, such as images of moving people. Tracking the three-dimensional (3D) poses of people from a single 2D RBG image may be difficult due to depth ambiguities, occlusions, and significant variations of appearances and scenes, for example.

Tracking 3D poses of people from 2D images may include using root-relative 3D poses of the people represented by the 2D images. To identify root-relative 3D poses (e.g., 3D locations of human body key-points relative to the root of the skeleton, such as the person's hip) of humans in a single 2D image, deep convolutional neural networks (CNNs) may use large-scale data sets to generate 3D coordinates of body parts relative to a root body part. In some applications, such as augmented reality, human-computer interaction, and the like, the absolute positions of body joints (e.g., fixed positions) may need to be estimated in a real-world coordinate system. To meet the requirement, a robust human localization technique may determine the 3D translation of each person in an image, thereby resulting in well-reconstructed root-relative 3D skeletons that appear in the correct physical locations.

Some existing techniques may use optimization-based post-processing methods that first implement deep CNN models to estimate 2D poses and root-relative 3D poses for any person in an image, then may determine a global root translation in the camera's coordinate system by minimizing an objective function by considering the projection error. However, it is difficult to achieve robust and stable tracking results using existing techniques unless both the estimated 2D pose and root-relative 3D pose are sufficiently accurate. Such techniques may not ensure temporal consistency of motion, and small inaccuracies of pose estimation may lead to sharp temporal jitter for the global position, resulting in an undesirable artifact for graphics and interaction applications.

Other existing techniques may use machine learning based on one-stage methods that use a deep neural network model to regress the absolute 3D pose from a cropped image, from the estimated 2D pose, or from the entire input image. It may be difficult to achieve highly accurate global position tracking results using such techniques, as the regressed distance from the input image may represent an approximation of the ground truth, and may not be highly accurate data with which to localize a person in the real-world space, but may be expected to output the correct relative ordering among different people in a same image.

There is therefore a need for enhanced real-time multi-person absolute 3D pose tracking using a single RGB camera.

In one or more embodiments, enhanced techniques provide a new real-time method for multi-person 3D absolute pose tracking using a single RGB camera. The enhanced techniques facilitate real-life scenarios such as when a camera is fixed (e.g., static) to capture one or more people in an image, and the people moving or performing actions on a ground plane. The enhanced techniques include receiving the video image as an input (e.g., from an online-calibrated camera), and outputting the human root localization and root-relative 3D pose for each person in real-time. The enhanced techniques may be employed for driving virtual characters in a virtual 3D space (e.g., for games, augmented/virtual reality, etc.).

In one or more embodiments, compared to existing techniques, the enhanced techniques herein provide a new framework to ensure the accuracy of human root localization, the robustness of the relative 3D pose, and the coherence and smoothness of the overall space-time tracking. For quantitative evaluation, the global position tracking error (GPTE) is smaller than 8.5 centimeters, and the mean per joint position error (MPJPE) of the root-relative 3D pose is about 30 millimeters, both outperforming existing techniques by a significant margin. For common human actions such as a large upper body movement while keeping feet static on the ground, the enhanced techniques may product improved stability and accuracy with regard to position tracking, whereas existing techniques may experience position jitter in depth.

In one or more embodiments, the enhanced techniques may include multiple steps. First, the camera may be fixed and calibrated to estimate the camera's pose and position in real-world 3D coordinate space. Second, the 2D pose for each person in the image may be estimated and tracked. Third, the root-relative 3D pose may be predicted based on 2D pose information (e.g., using a deep neural network). Fourth, a foot-floor contact event may be detected using both 2D and 3D pose information (e.g., to provide the relationship between a body part—the foot—and the ground plane so that the coordinates of other body parts may be determined based on the locations of the other body parts relative to the foot). Fifth, the absolute 3D pose may be optimized with temporal and ground contact constraints. Experimental data show that the enhanced techniques improve 3D tracking accuracy, smoothness, and robustness from 2D image data when compared to existing techniques. A system, for example, on the camera or remote from the camera (e.g., a separate device, cloud-based server, etc.) may perform the operations.

In one or more embodiments, the enhanced techniques may track the human root with precision in the real-world space with less jitter artifacts. In particular, a system may detect the pixel location of foot-floor contact (e.g., the fourth step described above) where a person's foot is in contact with the ground plane. The system may map the 2D pixel location to a 3D position in a real-world coordinate space using homographic estimation, for example. The system may optimize the root trajectory with the foot-floor contact constraint. To detect the foot-floor contact point in a 2D image, the system may use the 2D pose information for initial detection, then the regressed root-relative 3D pose for further refinement.

In one or more embodiments, the enhanced techniques may allow for design of kinematic games, such as soccer, in which a user may experience natural interaction to control game characters in a 3D virtual space.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 shows an example process 100 of tracking two-dimensional image data representing a body pose to generate a three-dimensional virtual representation of the body pose, according to some example embodiments of the present disclosure.

Figure 3:
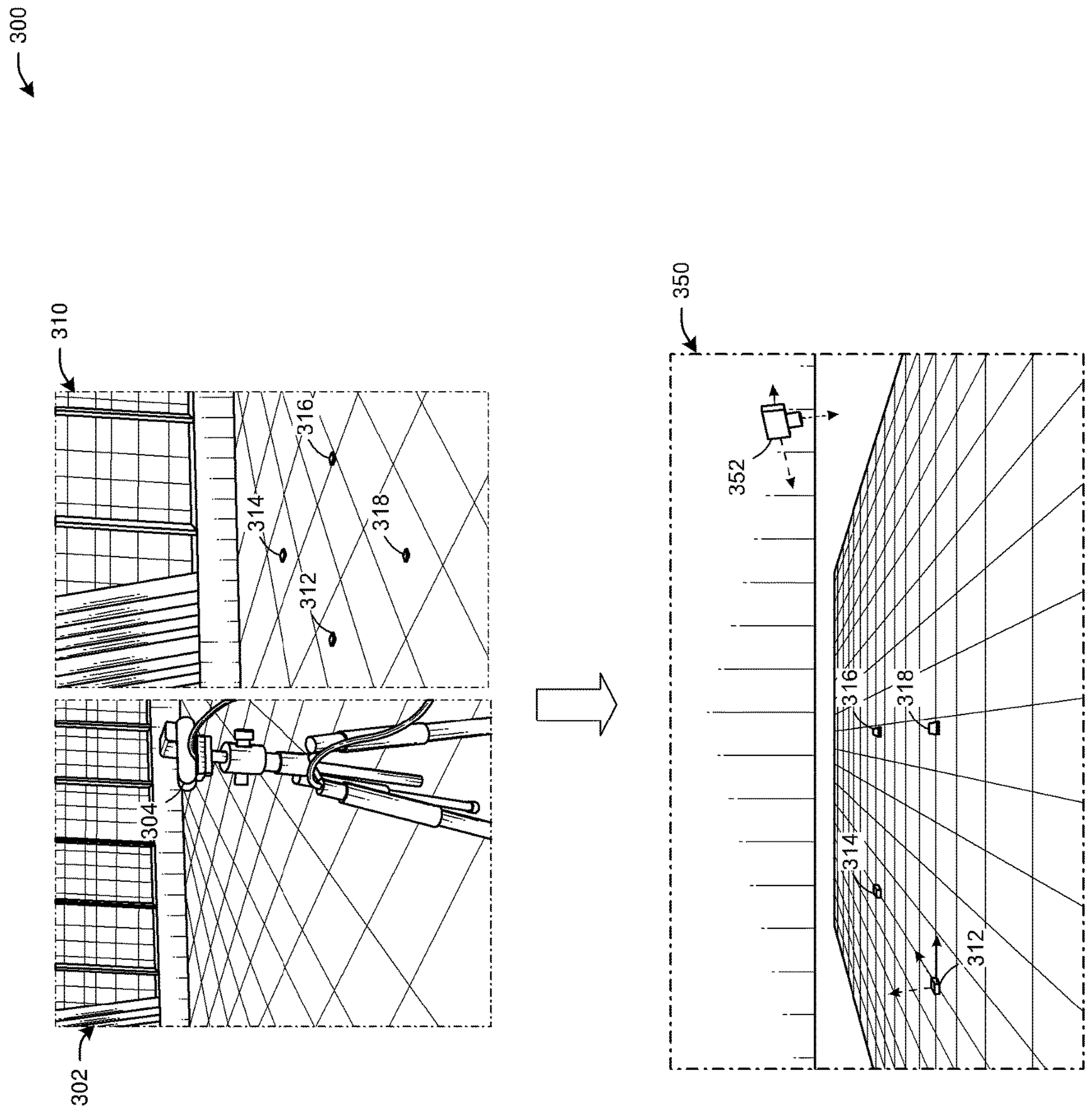
FIG. 3 shows an example system for real-time three-dimensional body pose tracking using a single camera, according to some example embodiments of the present disclosure.

Referring to FIG. 1, the process 100 may include receiving (e.g., from a camera as shown in FIG. 3) an image 102 whose image data may represent a person 104 in a pose (e.g., based on the combination of the person's body parts). The image 102 may be two-dimensional, and tracking the pose of the person 104 across multiple images may allow for real-time generation of 3D image data representing the person 104. As shown the image data from the image 102 may be used to generate a virtual environment 110 (e.g., a game, augmented or virtual reality, etc.) in which a virtual representation 120 of the person 104 may be three-dimensional, and the person's poses may represent an action (e.g., kicking a ball 122). The manner in which the 2D image data of the image 102 may be used to generate the 3D virtual representation of the virtual environment 110 is disclosed herein.

Figure 2:
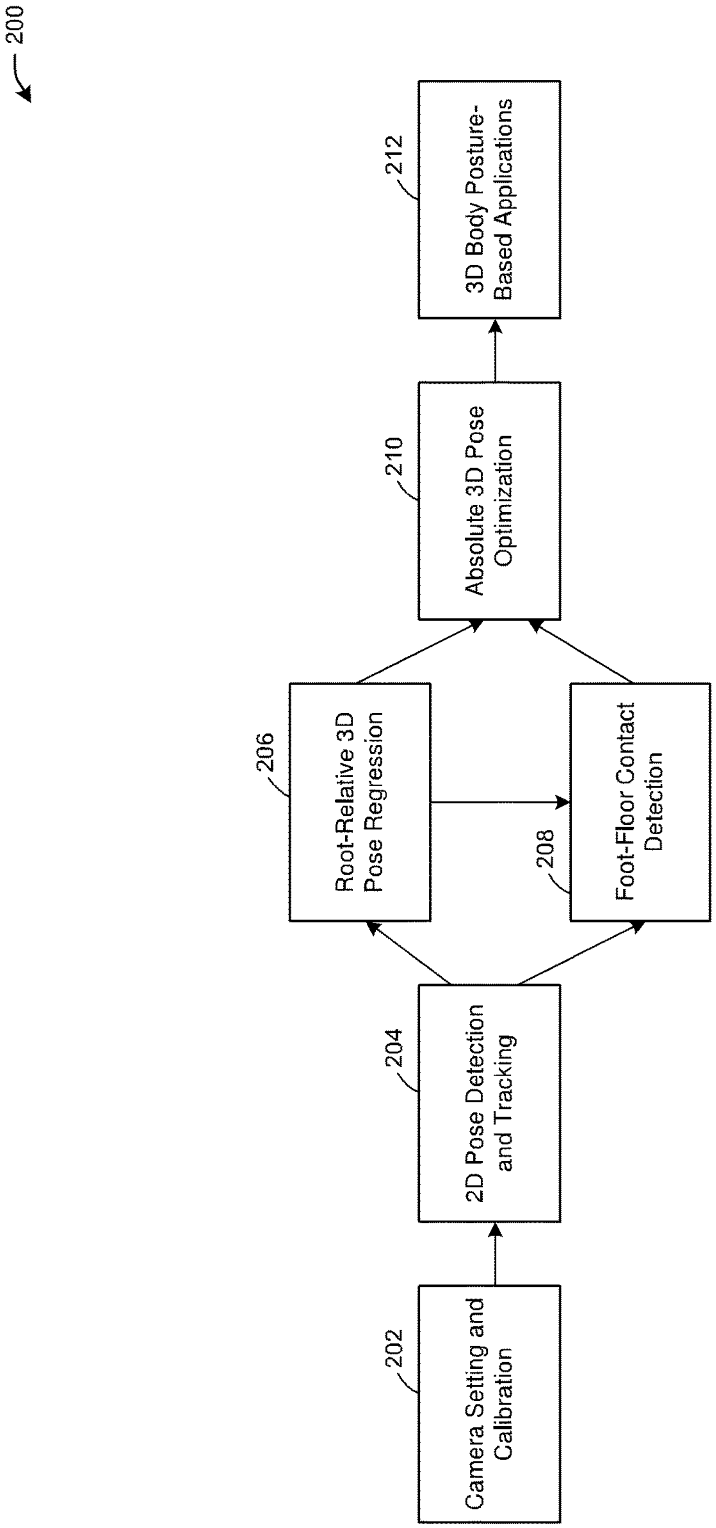
FIG. 2 shows an example process for real-time three-dimensional body pose tracking, according to some example embodiments of the present disclosure.

FIG. 2 shows an example process 200 for real-time three-dimensional body pose tracking, according to some example embodiments of the present disclosure. For example, the process 200 may be used to generate the 3D virtual representation of the virtual environment 110 of FIG. 1 based on the 2D image 102 of FIG. 1.

Referring to FIG. 2, the process 200 may include camera setting and calibration 202, 2D pose detection and tracking 204, root-relative 3D pose regression 206, foot-floor contact detection 208, absolute 3D pose optimization 210, and 3D body posture-based applications 212.

In one or more embodiments, a camera (e.g., as shown in FIG. 3) may be calibrated using the camera setting and calibration 202. Based on the possible area (e.g., environment) in which people may be moving, the camera may be set in a particular location, and the camera's focal length adjusted if needed. During the image capturing process, the camera may remain static with its settings unchanged. The camera setting and calibration 202 may use techniques such as OpenCV (e.g., computer vision), Matlab toolbox, or the like, to calibrate the camera's intrinsic parameters ($f_x$, $f_y$, $c_x$, $c_y$) where $f_x$, $f_y$ are the x and y focal lengths of the camera, respectively, and $c_x$, $c_y$ are the x and y coordinates of the optical center of the image plane, respectively, resulting in an intrinsic matrix $$K = \begin{bmatrix} f_x & 0 & c_x \\ 0 & f_y & c_y \\ 0 & 0 & 1 \end{bmatrix}.$$

In one or more embodiments, the camera setting and calibration 202 may include using a homographic estimation method for calibration of extrinsic camera parameters [R|t] that may be a combination of a 3×3 rotation matrix R and a 3×1 translation vector t, where:

$$[R \mid t] = \begin{bmatrix} r_{11} & r_{12} & r_{13} & t_x \\ r_{21} & r_{22} & r_{23} & t_y \\ r_{31} & r_{32} & r_{33} & t_z \end{bmatrix}.$$

The camera setting and calibration 202 may include marking four corners of a rectangle on the ground (e.g., FIG. 3), and selecting one of the four corners (e.g., coordinates) as the origin of a real-world coordinate system, providing four 3D coordinate points $(X_i, Y_i, 0)$ for the i-th respective corners as source points. The camera may capture an image of the marked ground (e.g., FIG. 3), allowing for identification of four 2D coordinate points $(x_i, y_i)$ for the i-th respective corners as destination points that correspond to the 3D source points.

In one or more embodiments, the camera setting and calibration 202 may include estimating a homographic matrix H by mapping the source points to the destination points:

$$\begin{bmatrix} x_i \\ y_i \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} X_i \\ Y_i \\ 1 \end{bmatrix} = H \begin{bmatrix} X_i \\ Y_i \\ 1 \end{bmatrix}.$$

In one or more embodiments, the camera setting and calibration 202 may include generating the extrinsic parameters [R|t] from the relation:

$$H = K \begin{bmatrix} h_{11} & h_{12} & h_{13} \\ h_{21} & h_{22} & h_{23} \\ h_{31} & h_{32} & h_{33} \end{bmatrix}.$$

According to the properties of the rotation matrix:

$$\begin{bmatrix} r_{13} \\ r_{23} \\ r_{33} \end{bmatrix} = \begin{bmatrix} r_{11} \\ r_{21} \\ r_{31} \end{bmatrix} \times \begin{bmatrix} r_{12} \\ r_{22} \\ r_{32} \end{bmatrix}.$$

In one or more embodiments, the 2D pose detection and tracking 204 may include receiving a video image $I_t$ including representations of one or more people's bodies, and using a 2D human pose detector such as OpenPose, YOLOv3+HRnet, or the like, to extract a 2D skeleton $$S_{2d} = \{p_{2d}^i\}_{i=1}^J$$

(e.g., for J key-points in image space) for each person represented by the image $I_t$. In addition to predicting 2D key-points for body positions, the 2D pose detection and tracking 204 may generate a set of confidence scores, each score $$C_{2d}^i$$

representing the detection credibility of $$p_{2d}^i.$$

A low $$C_{2d}^i$$

may indicate self-occluded key-points, and a high $$C_{2d}^i$$

may indicate non-occluded key-points. When more than one person is represented by the image $I_t$, the 2D pose detection and tracking 204 may adopt person-tracking algorithms (e.g., Deep SORT) to identify the respective 2D skeletons by person-unique labels to ensure that 2D skeletons from different video frames point to a same person. The extracted 2D skeletons $S_{2d}$ may be temporally filtered with (e.g., using a Euro filter) to achieve a final stable and smooth result. In this manner, the 2D pose detection and tracking 204 may use deep learning to generate 2D representations of the skeletons of people in images.

Figure 4A:
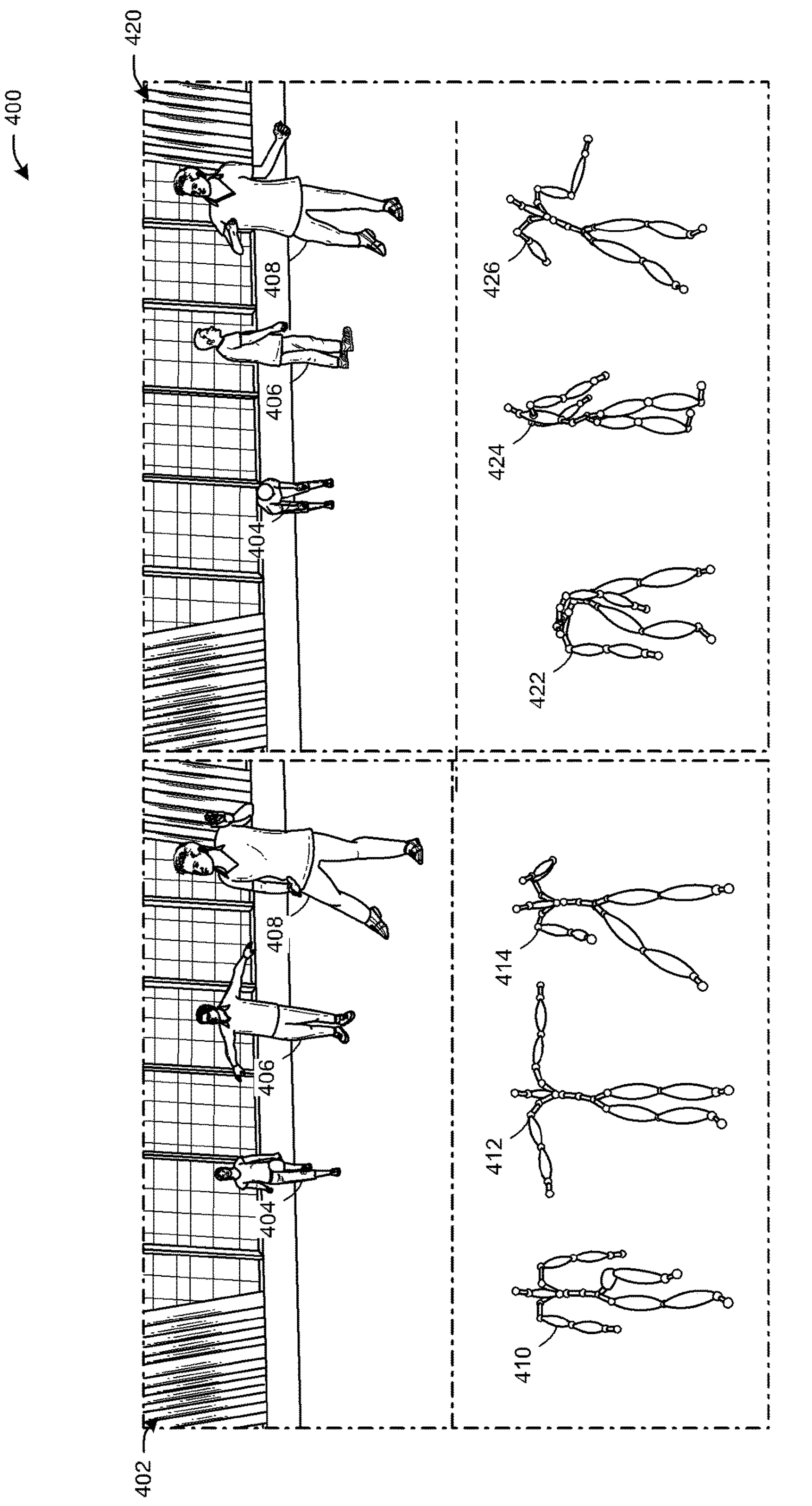
FIG. 4A shows two-dimensional images and their corresponding three-dimensional root-relative pose regressions, according to some example embodiments of the present disclosure.

In one or more embodiments, the root-relative 3D pose regression 206 may use a deep neural network trained in a supervised manner to regress the root-relative 3D pose in the form of joint rotations from a cropped image defined by a 2D pose (e.g., FIG. 4A). Predicting joint rotations instead of joint positions may ensure that limbs are symmetric and of valid length. In the network architecture, the root-relative 3D pose regression 206 may use ResNET50 pre-trained on ImageNet as a backbone to modify the last fully connected layer to output a vector including the joint rotations in 6DOF (six degrees of freedom) representation. The root-relative 3D pose regression 206 may use a SMPL (skinned multi-person linear) parametric model to represent 3D poses so that the output of the neural network may be a 144-dimensional vector (e.g., six dimensions for each of 24 joints). Given the regressed pose parameters and the pre-defined bone template, the root-relative 3D pose regression 206 may use a Forward Kinematics process to determine the 3D joint positions.

In one or more embodiments, the foot-floor contact detection 208 may rely on the observation that when feet are in contact with the ground plane, the feet usually have zero velocity (e.g., a threshold velocity of at or near zero). Accordingly, the foot-floor contact detection 208 may track one 2D key-point on the foot (e.g., heel or toe) temporally (e.g., across multiple images), and may determine the velocity of the 2D key-points of feet in image space. When the velocity is smaller than the threshold velocity, such may be an indication that the foot is in contact with the ground (e.g., a detection of foot-ground contact). However, using the zero velocity criteria alone may generate false detections, for example, when a person lifts a foot off the ground, but remains static. Therefore, the foot-floor contact detection 208 may use the root-relative 3D pose data from the root-relative 3D pose regression 206 to cancel the false positive foot-ground detection. In particular, the foot-floor contact detection 208 may transform the root-relative 3D joint positions from the camera coordinate system into the real-world system by using the calibrated extrinsic parameter R. The floor contact detection 208 may determine the distance between each 3D foot joint and the ground plane, selecting the foot with the smaller distance as the foot touching the ground (e.g., FIGS. 4B and 4C). In this manner, the foot-floor position indicates where someone is relative to the ground plane, and the relationship between one body part (e.g., the foot) and the ground plane in combination with the root-relative 3D joint positions allows for determining the absolute 3D body poses. Accordingly, the foot-floor contact detection 208 may be used to improve the accuracy of the 3D pose estimation.

In one or more embodiments, the absolute 3D pose optimization 210 may use the detected 2D key-point (x,y) on the ground plane to generate the absolute position for the foot key-point $P_{abs}=(X,Y,0)$ in the real-world space using the estimated homographic matrix:

$$\begin{bmatrix} X \\ Y \\ 1 \end{bmatrix} = H^{-1}\begin{bmatrix} x \\ y \\ 1 \end{bmatrix}.$$

Then, the human root position $r_{init}=P_{abs}-P_{rel}$, where $P_{rel}$ is the root-relative 3D position for the foot key-point. Using the regressed root-relative 3D pose parameters $\theta_{nit}$ and the estimated root position $r_{init}$ as initial values, the absolute 3D pose optimization 210 may optimize for improved absolute 3D pose data with temporal and ground contact restraints.

In one or more embodiments, the absolute 3D pose optimization 210 may solve the following optimization equation to ensure temporal smoothness and accurate trajectory:

$E(\theta,r)=w_1*E_{2d}(\theta,r)+w_2*E_{reg1}(\theta)+w_3*E_{reg2}(r)+w_4*E_{tem1}(\theta)+w_4*E_{tem2}(r)$, where $E_{2d}(\theta,r)=\|C_{2d}\cdot(K(R(KF(\theta)+r)+t)-S_{2d})\|_2$, $E_{reg1}(\theta)=\|\theta-\theta_{init}\|_2$, $E_{reg2}(r)=\|r-r_{init}\|_2$, $E_{tem1}(\theta)=\|\theta^{t-1}-\theta^t\|_2$, and $$E_{tem2}(r) = y^{t-1}y^t\|P^{t-1}_{abs} - P^t_{abs})\|_2.$$

$E_{2d}$ measures the distance (e.g., difference) between the projection of the absolute 3D pose and the input 2D key-points $S_{2d}$, and the error for each joint may be weighted by the detection confidence from the 2D pose detector. $KF(\theta)$ may be the forward kinematics process to generate the 3D joint positions from the input joint rotations. K, R, and t may be the respective camera intrinsic and extrinsic parameters. $E_{reg1}$ measures the similarity between the optimized 3D pose parameter and the initial 3D pose parameters predicted by the deep neural network. $E_{reg2}$ measures the similarity between the optimized root position and the initial root position by homographic estimation. $E_{tem1}$ and $E_{tem2}$ are the smoothness loss measuring difference between adjacent frames (e.g., images). $y^t$ is a binary label of ground contact status for the foot-key point at frame t.

$$P^t_{abs}$$

is the global position for the foot-joint. $w_1$-$w_4$ are scalar weights. The values of θ,r are unknown parameters to solve (e.g., minimize) to ensure temporal smoothness and accurate trajectory for the optimized 3D poses.

In one or more embodiments, the 3D body posture-based applications 212 may include virtual games, virtual reality, augmented reality, and the like. As shown in FIG. 1, the 3D body posture-based applications 212 may include a soccer game as the virtual environment 110. Using the process 200, 2D image data from a single, static camera may be used to track human body poses in 3D across multiple images, and the absolute 3D pose optimization 210 may generate optimized absolute 3D pose data for people represented by the 2D image data. Using an application engine, the 3D body posture-based applications 212 may generate the virtual environment 110 to represent a person's body poses as part of a game or other application, showing the optimized 3D body poses within the virtual environment 110.

FIG. 3 shows an example system 300 for real-time three-dimensional body pose tracking using a single camera, according to some example embodiments of the present disclosure.

Referring to FIG. 3, the system 300 may include an environment 302 in which a camera 304 is set and calibrated (e.g., using the camera setting and calibration 202 of FIG. 2). Using environment 310 (e.g., from the point-of-view of the camera 304), the ground may be marked with four points (e.g., corners): coordinate 312, coordinate 314, coordinate 316, and coordinate 318, each representing 3D coordinates X-Y-Z as $(X_i,Y_i,0)$ for the i-th respective corners as source points. The camera 304 may capture an image of the marked ground (e.g., FIG. 3), allowing for identification of four 2D coordinate points $(x_i,y_i)$ for the i-th respective corners as destination points that correspond to the 3D source points.

Still referring to FIG. 3, as a result of the camera setting and calibration 202, a real-world space 350 may represent the pose and position of the camera 304 relative to the four marked points on the ground. As described with respect to FIG. 2, the camera setting and calibration 202 may estimate the homographic matrix using a mapping from the source points to the destination points, and may generate the extrinsic camera parameter accordingly. The extrinsic parameter may be used by the foot-floor contact detection 208 as described with respect to FIG. 2.

FIG. 4A shows two-dimensional images and their corresponding three-dimensional root-relative pose regressions, according to some example embodiments of the present disclosure.

Referring to FIG. 4A, image 402 (e.g., captured by the camera 304 of FIG. 3), representing body poses of person 404, person 406, and person 408, may result in root-relative 3D pose regression 410, root-relative 3D pose regression 412, and root-relative 3D pose regression 414, respectively (e.g., using the root-relative 3D pose regression 206 of FIG. 2).

Still referring to FIG. 4A, image 420 (e.g., captured by the camera 304 of FIG. 3), representing body poses of the person 404, the person 406, and the person 408, may result in root-relative 3D pose regression 422, root-relative 3D pose regression 424, and root-relative 3D pose regression 426, respectively (e.g., using the root-relative 3D pose regression 206 of FIG. 2).

Figure 4B:
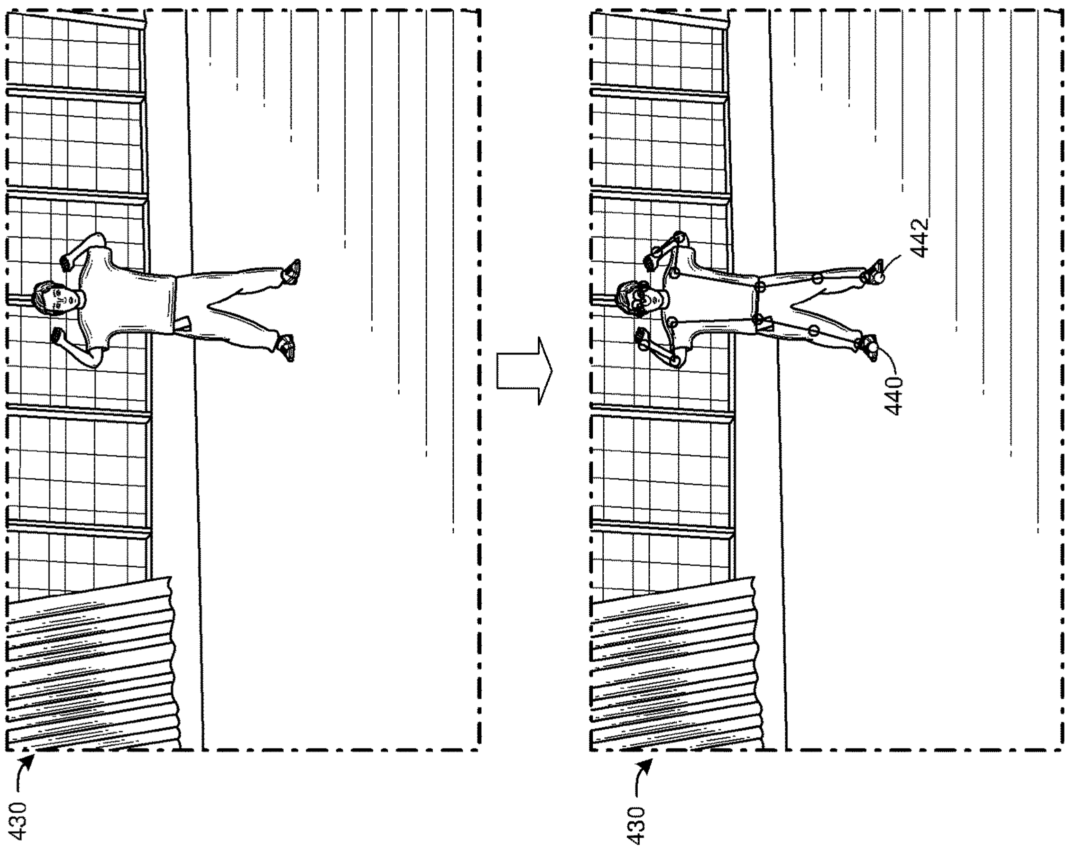
FIG. 4B shows a two-dimensional image with estimated two-dimensional key-points used to identify foot contact with the ground, according to some example embodiments of the present disclosure.

FIG. 4B shows a two-dimensional image 430 with estimated two-dimensional key-points used to identify foot contact with the ground, according to some example embodiments of the present disclosure.

Figure 4C:
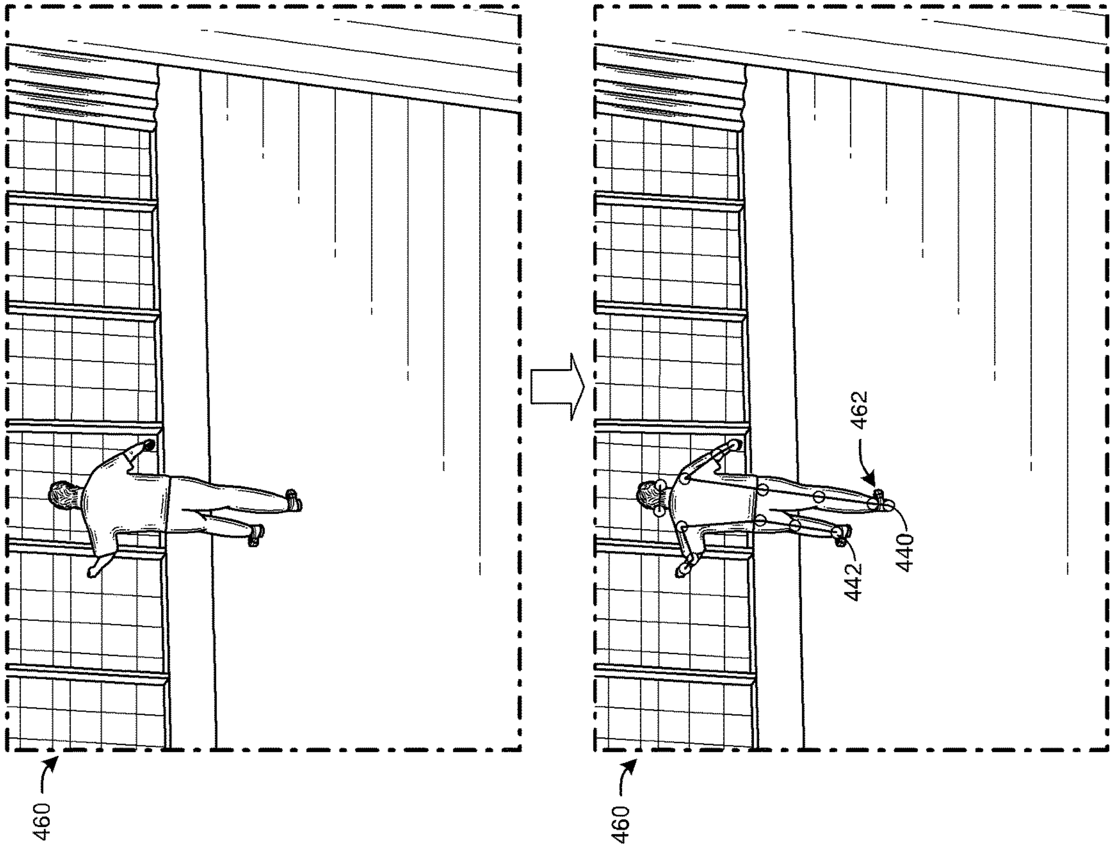
FIG. 4C shows a two-dimensional image with estimated two-dimensional key-points used to identify foot contact with the ground, according to some example embodiments of the present disclosure.

Referring to FIG. 4B, the two-dimensional image 430 may represent a person (e.g., the person 404, the person 406, or the person 408 of FIG. 4A). When a 2D key-point 440 and/or key-point 442 of the person's foot moves (e.g., across multiple images, as shown in FIGS. 4B and 4C) with a velocity less than a threshold velocity, such may be an indication of the foot contact with the ground. To avoid a false positive detection of the foot contact with the ground, the foot-floor contact detection 208 of FIG. 2 may transform the root-relative 3D joint positions (e.g., the root-relative 3D pose regressions of FIG. 4A) from the camera coordinate system to the real-world space 350 of FIG. 3 by using the extrinsic camera parameter, and may identify the foot having the smallest distance to the ground plane as the foot associated with the foot contact with the ground (e.g., the foot making contact with the ground).

FIG. 4C shows a two-dimensional image 460 with estimated two-dimensional key-points used to identify foot contact with the ground, according to some example embodiments of the present disclosure.

Referring to FIG. 4C, the two-dimensional image 460 may represent a person (e.g., the person 404, the person 406, or the person 408 of FIG. 4A). When a 2D key-point 440 and/or key-point 442 of the person's foot moves (e.g., across multiple images, as shown in FIGS. 4B and 4C) with a velocity less than a threshold velocity, such may be an indication of the foot contact with the ground. To avoid a false positive detection of the foot contact with the ground, the foot-floor contact detection 208 of FIG. 2 may transform the root-relative 3D joint positions (e.g., the root-relative 3D pose regressions of FIG. 4A) from the camera coordinate system to the real-world space 350 of FIG. 3 by using the extrinsic camera parameter, and may identify the foot having the smallest distance to the ground plane as the foot associated with the foot contact with the ground (e.g., the foot making contact with the ground). When the key-point 440 exhibits a velocity, across the images in FIGS. 4B and 4C, less than the threshold velocity, such may indicate foot-ground contact 462. The foot-floor contact detection 208 may determine that the distance between the key-point 440 and the ground is less than the distance between the key-point 442 and the ground, indicating that the foot-ground contact 462 is represented by the key-point 442. Because of the relationship between the joints from the 3D regression data, the absolute 3D pose optimization 210 of FIG. 2 may generate the optimized absolute 3D pose data to represent the 3D body poses based on the 2D image data of the images.

Figure 5:
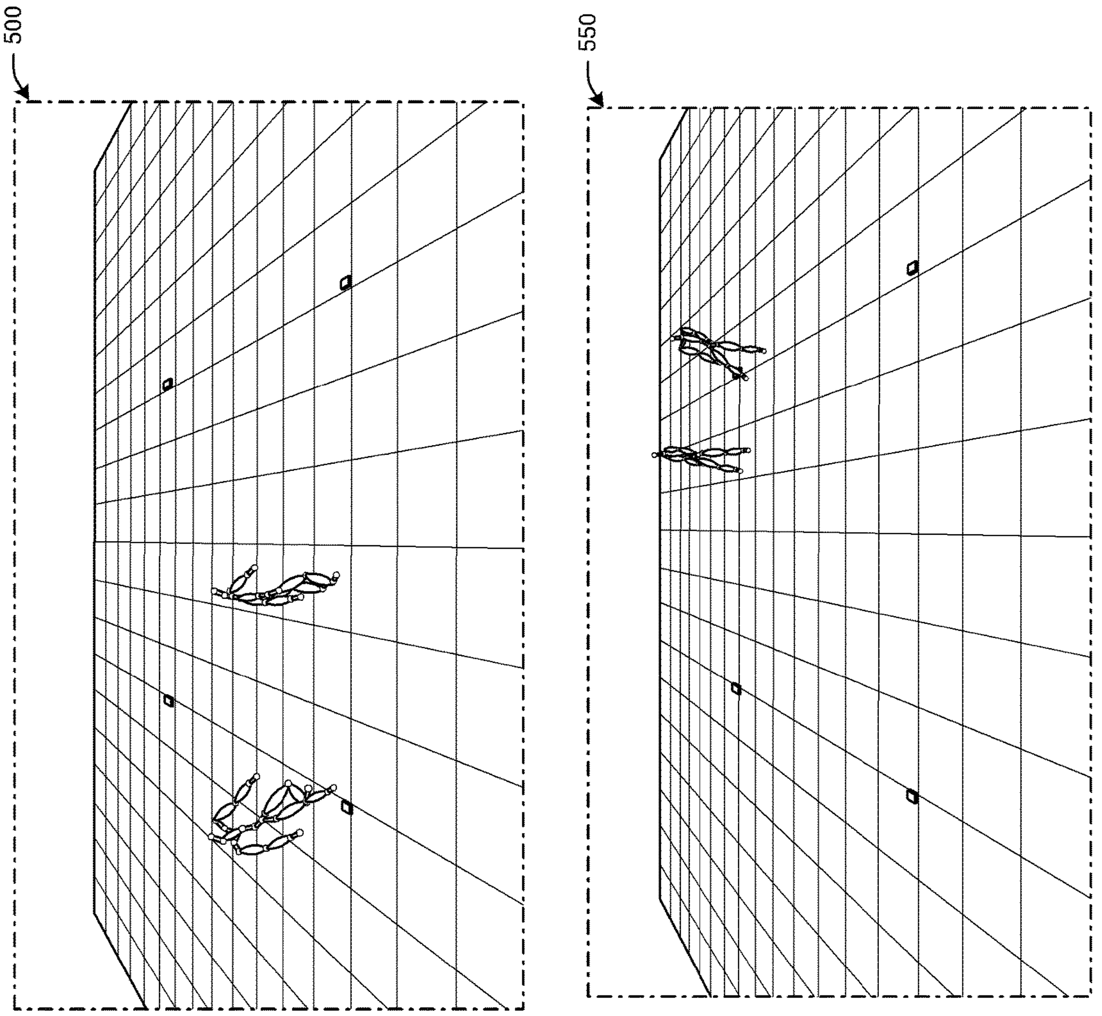
FIG. 5 shows multi-person three-dimensional absolute pose tracking, according to some example embodiments of the present disclosure.

FIG. 5 shows multi-person three-dimensional absolute pose tracking, according to some example embodiments of the present disclosure.

Referring to FIG. 5, optimized 3D absolute pose data 500 and 550 may be generated by the absolute 3D pose optimization 210 of FIG. 2 using 2D images (e.g., the image 402, the image 420 of FIG. 4A). Using the 3D pose regressions of FIG. 4A and the detected foot contact with the ground in FIGS. 4B and 4C, the absolute 3D pose optimization 210 may generate the optimized 3D absolute pose data 500 and 550 to represent the body poses and motion of multiple people in a 3D real-world coordinate system based on 2D images. In this manner, the optimized 3D absolute pose data 500 and 550 may represent the outputs of the absolute 3D pose optimization 210 using the process 200 of FIG. 2.

Figure 6:
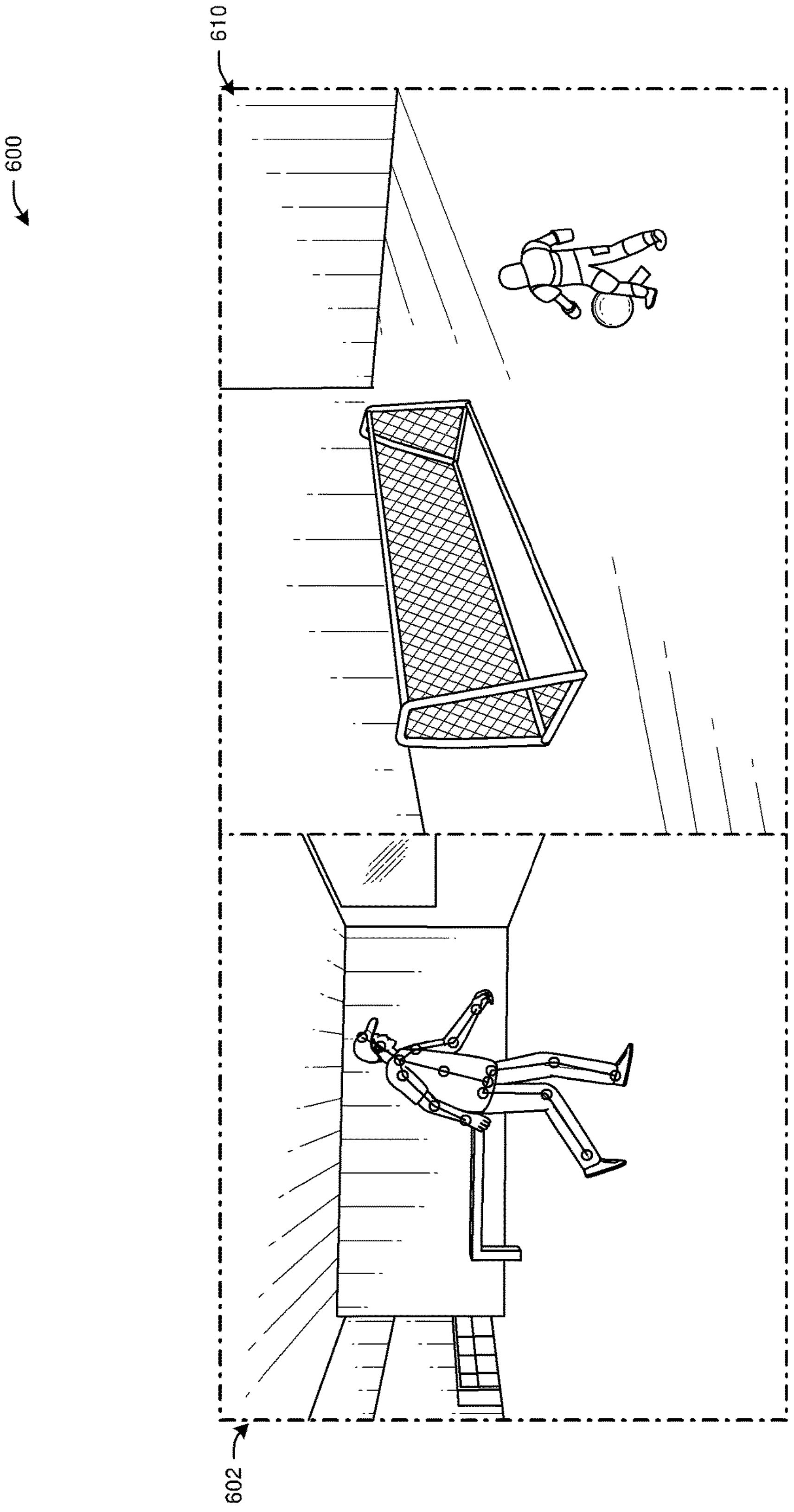
FIG. 6 shows an example process of tracking two-dimensional image data representing a body pose to generate a three-dimensional virtual representation of the body pose, according to some example embodiments of the present disclosure.

FIG. 6 shows an example process 600 of tracking two-dimensional image data representing a body pose to generate a three-dimensional virtual representation of the body pose, according to some example embodiments of the present disclosure.

Referring to FIG. 6, 2D image data from an image 602 (e.g., captured by the camera 304 of FIG. 3) may represent a person's body pose. Using multiple images, the process 200 of FIG. 2 may track the person's body poses to generate an optimized 3D representation of them to use as a virtual environment 610, showing a virtual representation of the person represented by the 2D image data. In this manner, the virtual environment 610 may represent the output of the 3D body posture-based applications 212 of FIG. 2.

Figure 7:
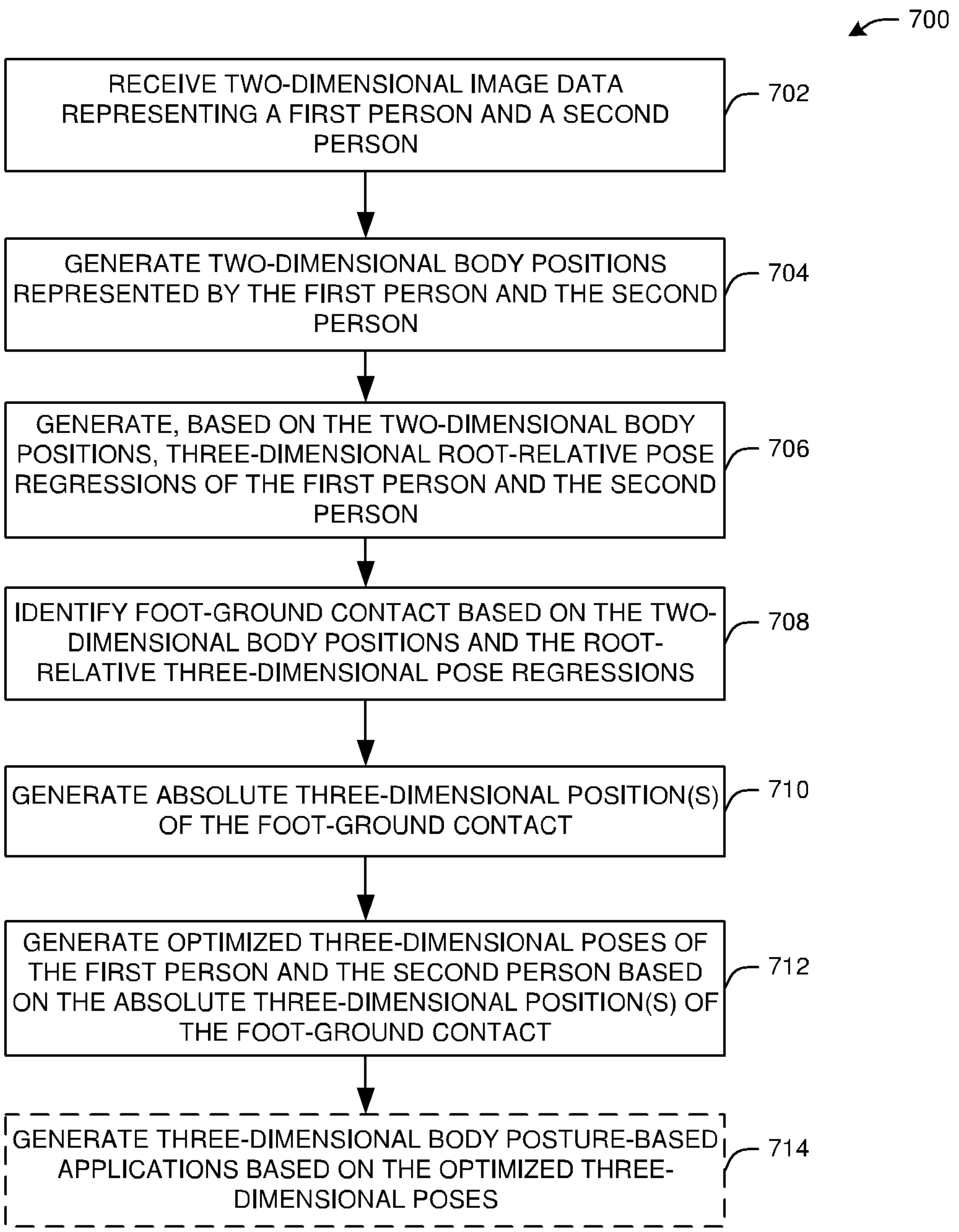
FIG. 7 illustrates a flow diagram of an illustrative process for real-time multi-dimensional three-dimensional body pose tracking using a single camera, in accordance with one or more example embodiments of the present disclosure.

FIG. 7 illustrates a flow diagram of an illustrative process 700 for real-time multi-dimensional three-dimensional body pose tracking using a single camera, in accordance with one or more example embodiments of the present disclosure.

At block 702, a device (e.g., the one or more pose devices 819 of FIG. 8, the one or more AI accelerators 867 of FIG. 8) may receive 2D image data representing multiple people in one or more images (e.g., images 402 and 420 of FIG. 4A). The images may be captured by a single RGB camera (e.g., the camera 304 of FIG. 3), which may be calibrated (e.g., using the camera setting and calibration 202 of FIG. 2) to generate extrinsic parameters to be used in detecting foot-floor contact represented by one or more of the people in the image data.

At block 704, the device may generate two-dimensional body positions (e.g., 2D coordinates of body positions) representing the first and second person, respectively, in the 2D image data. In particular, the device may generate first two-dimensional positions of body parts represented by the first person in the 2D image data (e.g., using the 2D pose detection and tracking 204 of FIG. 2). The device may generate second tow-dimensional positions of body parts represented by the first second in the 2D image data, and so on for any additional people represented in the image data. The device may use a first deep learning neural network (e.g., machine learning model) to generate the two-dimensional body positions.

At block 706, the device may generate root-relative three-dimensional pose regressions (e.g., as shown in FIG. 4A) based on the respective 2D body positions of block 704 (e.g., using the root-relative 3D pose regression 206 of FIG. 2). The device may use a first deep learning neural network (e.g., machine learning model) to generate the root-relative three-dimensional pose regressions. The root-relative three-dimensional pose regressions may include a multi-dimensional vector representing data for multiple joints of the body parts in the image data.

At block 708, the device may identify foot-ground contact based on a combination of the two-dimensional body positions and the root-relative three-dimensional pose regressions (e.g., using the foot-floor contact detection 208 of FIG. 2). The foot-floor contact detection may track one 2D key-point on the foot (e.g., heel or toe) temporally (e.g., across multiple images as shown in FIGS. 4B and 4C), and may determine the velocity of the 2D key-points of feet in image space. When the velocity is smaller than the threshold velocity, such may be an indication that the foot is in contact with the ground (e.g., a detection of foot-ground contact). To reduce false positive detections, foot-floor contact detection may use the root-relative 3D pose regressions from block 706 to cancel the false-positive foot-ground detection. In this manner, the foot-floor position indicates where someone is relative to the ground plane, and the relationship between one body part (e.g., the foot) and the ground plane in combination with the root-relative 3D joint positions allows for determining the absolute 3D body poses. Accordingly, the foot-floor contact detection may be used to improve the accuracy of the 3D pose estimation.

At block 710, the device may generate absolute 3D positions of any foot-ground contact identified at block 708 (e.g., using the absolute 3D pose optimization 210 of FIG. 2). Based the detected 2D key-point of a foot identified as in contact with the ground plane at block 708, the device may generate an absolute 3D position in the real-world 3D space using the estimated homographic matrix. In this manner, because the foot-floor contact identification is enhanced at block 708 using the root-relative 3D pose regressions to reduce false positive-detections, and because of the estimated homographic matrix from the camera calibration, the device may have a more accurate 3D root-relative point of the foot with which to optimize the 3D position data of the other body parts.

At block 712, the device may generate optimized 3D poses of the first and second person (and any other person in the image data) based on the absolute 3D positions of any foot-ground contact (e.g., using the absolute 3D pose optimization 210 of FIG. 2). Using the root-relative parameters (e.g., the multi-dimensional vector representing data for multiple joints of the body parts in the image data) and the estimated root position of the foot in contact with the ground, the device may optimize the root-relative 3D pose regression data to improve the accuracy of the absolute 3D poses of the people represented by the image data. The optimized 3D poses may be represented in a 3D real-world space (e.g., as shown in FIG. 5).

At block 714, optionally, the device may generate 3D body posture-based applications based on the optimized 3D poses generated at block 712 (e.g., using the 3D body posture-based applications 212 of FIG. 2). For example, movements represented by the body poses may be represented in a virtual environment as shown in FIGS. 1 and 6, so the people represented by the images may perform movements that correspond to displayed in movements in a game, such as running, swinging, kicking, jumping, stretching, gesturing, etc.

It is understood that the above descriptions are for purposes of illustration and are not meant to be limiting.

Figure 8:
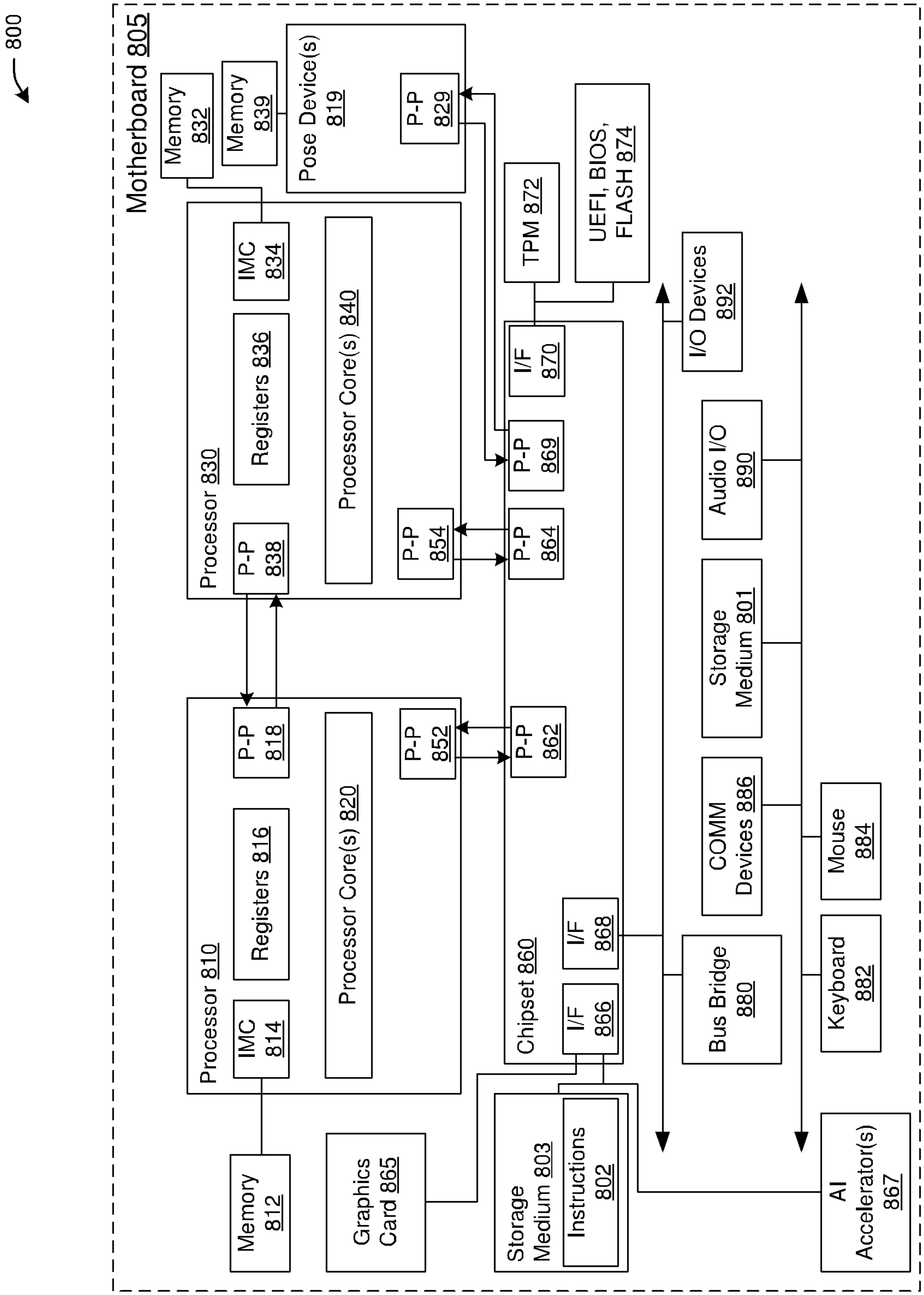
FIG. 8 illustrates an embodiment of an exemplary system, in accordance with one or more example embodiments of the present disclosure.

FIG. 8 illustrates an embodiment of an exemplary system 800, in accordance with one or more example embodiments of the present disclosure.

In various embodiments, the system 800 may comprise or be implemented as part of an electronic device, such as the camera 304 of FIG. 3, a remote device (e.g., server/cloud-based device), a smartphone, tablet, laptop, smart home device, or the like.

The embodiments are not limited in this context. More generally, the system 800 is configured to implement all logic, systems, processes, logic flows, methods, equations, apparatuses, and functionality described herein and with reference to the figures.

The system 800 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 800 may have a single processor with one core or more than one processor. Note that the term "processor" refers to a processor with a single core or a processor package with multiple processor cores.

In at least one embodiment, the computing system 800 is representative of one or more components capable of performing the process 200 of FIG. 2 and the process 700 of FIG. 7. More generally, the computing system 800 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 800. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard 805 for mounting platform components. The motherboard 805 is a point-to-point (P-P) interconnect platform that includes a processor 810, a processor 830 coupled via a P-P interconnects/interfaces as an Ultra Path Interconnect (UPI), and one or more pose devices 819 (e.g., capable of performing the process 200 of FIG. 2 and the process 700 of FIG. 7). In this manner, the one or more pose devices 819 may include multiple neural networks or other machine learning models, and may include multiple hardware to facilitate the machine learning (e.g., tensor processing units and/or other application-specific integrated circuits using AI accelerators, such as the one or more AI accelerators 867). In other embodiments, the system 800 may be of another bus architecture, such as a multi-drop bus. Furthermore, each of processors 810 and 830 may be processor packages with multiple processor cores. As an example, processors 810 and 830 are shown to include processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

The processors 810 and 830 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 810, and 830.

The processor 810 includes an integrated memory controller (IMC) 814 and P-P interconnects/interfaces 818 and 852. Similarly, the processor 830 includes an IMC 834 and P-P interconnects/interfaces 838 and 854. The IMC's 814 and 834 couple the processors 810 and 830, respectively, to respective memories, a memory 812, and a memory 832. The memories 812 and 832 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 812 and 832 locally attach to the respective processors 810 and 830.

In addition to the processors 810 and 830, the system 800 may include the one or more pose devices 819. The one or more pose devices 819 may be connected to chipset 860 by means of P-P interconnects/interfaces 829 and 869. The one or more pose devices 819 may also be connected to a memory 839. In some embodiments, the one or more pose devices 819 may be connected to at least one of the processors 810 and 830. In other embodiments, the memories 812, 832, and 839 may couple with the processor 810 and 830, and the one or more pose devices 819 via a bus and shared memory hub.

System 800 includes chipset 860 coupled to processors 810 and 830. Furthermore, chipset 860 can be coupled to storage medium 803, for example, via an interface (I/F) 866. The I/F 866 may be, for example, a Peripheral Component Interconnect-enhanced (PCI-e). The processors 810, 830, and the one or more pose devices 819 may access the storage medium 803 through chipset 860.

Storage medium 803 may comprise any non-transitory computer-readable storage medium or machine-readable storage medium, such as an optical, magnetic, or semiconductor storage medium. In various embodiments, storage medium 803 may comprise an article of manufacture. In some embodiments, storage medium 803 may store computer-executable instructions, such as computer-executable instructions 802 to implement one or more of processes or operations described herein, (e.g., process 200 of FIG. 2, the process 700 of FIG. 7). The storage medium 803 may store computer-executable instructions for any equations depicted above. The storage medium 803 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 810 couples to a chipset 860 via P-P interconnects/interfaces 852 and 862 and the processor 830 couples to a chipset 860 via P-P interconnects/interfaces 854 and 864. Direct Media Interfaces (DMIs) may couple the P-P interconnects/interfaces 852 and 862 and the P-P interconnects/interfaces 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the UEFI, BIOS, Flash component 874 via an interface (I/F) 870. The TPM 872 is a dedicated microcontroller designed to secure hardware by integrating cryptographic keys into devices. The UEFI, BIOS, Flash component 874 may provide pre-boot code.

Furthermore, chipset 860 includes the I/F 866 to couple chipset 860 with a high-performance graphics engine, graphics card 865. In other embodiments, the system 800 may include a flexible display interface (FDI) between the processors 810 and 830 and the chipset 860. The FDI interconnects a graphics processor core in a processor with the chipset 860.

Various I/O devices 892 couple to the bus 881, along with a bus bridge 880 that couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, a storage medium 801, and an audio I/O 890.

The artificial intelligence (AI) accelerator(s) 867 may be circuitry arranged to perform computations related to AI. The AI accelerator(s) 867 may be connected to storage medium 801 and chipset 860. The AI accelerator(s) 867 may deliver the processing power and energy efficiency needed to enable abundant data computing. The AI accelerator(s) 867 is a class of specialized hardware accelerators or computer systems designed to accelerate artificial intelligence and machine learning applications, including artificial neural networks and machine vision. The AI accelerator(s) 867 may be applicable to algorithms for robotics, internet of things, other data-intensive and/or sensor-driven tasks.

Many of the I/O devices 892, communication devices 886, and the storage medium 801 may reside on the motherboard 805 while the keyboard 882 and the mouse 884 may be add-on peripherals. In other embodiments, some or all the I/O devices 892, communication devices 886, and the storage medium 801 are add-on peripherals and do not reside on the motherboard 805.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:

generating, by at least one processor circuit based on at least one instruction, first two-dimensional positions of body parts based on two-dimensional image data representing a first person and a second person, the first two-dimensional positions associated with the first person;

generating, by one or more of the at least one processor circuit, second two-dimensional positions of body parts based on the two-dimensional image data, the second two-dimensional positions associated with the second person;

generating, based on a deep neural network and the first two-dimensional positions, a first root-relative three-dimensional pose regression of the body parts associated with the first person;

generating, based on the deep neural network and the second two-dimensional positions, a second root-relative three-dimensional pose regression of the body parts associated with the second person;

identifying, by one or more of the at least one processor circuit, and based on the first two-dimensional positions and the first root-relative three-dimensional pose regression, contact between a ground plane and a foot of the first person;

identifying, by one or more of the at least one processor circuit, and based on the second two-dimensional positions and the second root-relative three-dimensional pose regression, contact between the ground plane and a foot of the second person;

generating, by one or more of the at least one processor circuit, a first absolute three-dimensional position of the contact between the ground plane and the foot of the first person;

generating, by one or more of the at least one processor circuit, a second absolute three-dimensional position of the contact between the ground plane and the foot of the second person;

identifying, by one or more of the at least one processor circuit, a two-dimensional position of the contact between the ground plane and the foot of the first person;

identifying, by one or more of the at least one processor circuit, two-dimensional positions of the ground plane based on the two-dimensional image data;

generating a homographic matrix to map the two-dimensional positions of the ground plane to three-dimensional positions of the ground plane;

generating a three-dimensional root position of the foot of the first person based on the homographic matrix;

generating, by one or more of the at least one processor circuit, a first three-dimensional pose of the body parts associated with the first person based on a difference between the first absolute three-dimensional position and the three-dimensional root position of the foot of the first person; and generating, by one or more of the at least one processor circuit, and based on the second absolute three-dimensional position, a second three-dimensional pose of the body parts associated with the second person.

2. The method of claim 1, wherein:

the generating of the first absolute three-dimensional position is based on the homographic matrix, and the generating of the second absolute three-dimensional position is based on the homographic matrix.

3. The method of claim 2, wherein the two-dimensional image data is from a camera, and including:

generating extrinsic parameters of the camera based on the homographic matrix and a focal length of the camera, the extrinsic parameters including a rotation matrix and a translation vector associated with the camera, wherein:

the generating of the first three-dimensional pose is based on the extrinsic parameters, and the generating of the second three-dimensional pose is based on the extrinsic parameters.

4. The method of claim 1, further comprising wherein the two-dimensional position of the contact between the ground plane and the foot of the first person is a first two-dimensional position, and including:

identifying a second two-dimensional position of the contact between the ground plane and the foot of the second person;

determining, based on the first two-dimensional position, that a first velocity of the foot of the first person is below a threshold velocity;

determining, based on the second two-dimensional position, that a second velocity of the foot of the second person is below the threshold velocity;

verifying the contact between the ground plane and the foot of the first person is further based on the first velocity of the foot of the first person being below the threshold velocity; and verifying the contact between the ground plane and the foot of the second person is further based on the second velocity of the foot of the second person being below the threshold velocity.

5. The method of claim 1, including:

determining a second difference between the first three-dimensional pose and the first root-relative three-dimensional pose regression; and generating, based on the second difference, a third three-dimensional pose of the body parts associated with the first person.

6. The method of claim 1, including:

determining an image difference between a first image including the two-dimensional image data and a second image including second two-dimensional image data representing the first person and the second person; and generating, based on the image difference, a third three-dimensional pose of the body parts associated with the first person.

7. The method of claim 1, wherein the two-dimensional image data is from a camera, and including:

generating extrinsic parameters of the camera based on the homographic matrix and a focal length of the camera, the extrinsic parameters including a rotation matrix and a translation vector for the camera; and determining, based on the extrinsic parameters, differences between the first absolute three-dimensional position and the first two-dimensional positions, wherein the generating of the first absolute three-dimensional position is based on the differences.

8. A system comprising:

memory;

instructions; and at least one processor circuit to be programmed based on the instructions to:

generate, based on two-dimensional image data representing a first person and a second person, first two-dimensional positions of body parts associated with the first person, the two-dimensional image data from a camera;

generate, based on the two-dimensional image data, second two-dimensional positions of body parts associated with the second person;

cause a deep neural network to generate, based on the first two-dimensional positions, a first root-relative three-dimensional pose regression of the body parts associated with the first person;

cause the deep neural network to generate, based on the second two-dimensional positions, a second root-relative three- dimensional pose regression of the body parts associated with the second person;

identify, based on the first two-dimensional positions and the first root-relative three-dimensional pose regression, contact between a ground plane and a foot of the first person;

identify, based on the second two-dimensional positions and the second root-relative three-dimensional pose regression, contact between the ground plane and a foot of the second person;

generate a first absolute three-dimensional position of the contact between the ground plane and the foot of the first person;

generate a second absolute three-dimensional position of the contact between the ground plane and the foot of the second person;

identify two-dimensional positions of the ground plane based on the two-dimensional image data;

generate a homographic matrix to map the two-dimensional positions of the ground plane to three-dimensional positions of the ground plane;

generate extrinsic parameters of the camera based on the homographic matrix and a focal length of the camera, the extrinsic parameters including a rotation matrix and a translation vector associated with the camera;

determine, based on the extrinsic parameters, differences between the first absolute three-dimensional position and at least some of the first two-dimensional positions;

generate, based on the first absolute three-dimensional position and the differences, a first three-dimensional pose of the body parts represented by the first person; and generate, based on the second absolute three-dimensional position, a second three-dimensional pose of the body parts represented by the second person.

9. The system of claim 8, wherein one or more of the at least one processor circuit is to:

generate the first absolute three-dimensional position based on the homographic matrix; and generate the second absolute three-dimensional position based on the homographic matrix.

10. The system of claim 8, wherein one or more of the at least one processor circuit is to:

identify a first two-dimensional position of the contact between the ground plane and the foot of the first person;

identify a second two-dimensional position of the contact between the ground plane and the foot of the second person;

determine, based on the first two-dimensional position, that a first velocity of the foot of the first person is below a threshold velocity;

determine, based on the second two-dimensional position, that a second velocity of the foot of the second person is below the threshold velocity;

verify the contact between the ground plane and the foot of the first person is further based on the first velocity of the foot of the first person being below the threshold velocity; and verify the contact between the ground plane and the foot of the second person based on the second velocity of the foot of the second person being below the threshold velocity.

11. The system of claim 8, wherein one or more of the at least one processor circuit is to:

identify a two-dimensional position of the contact between the ground plane and the foot of the first person; and identify two-dimensional positions of the ground plane based on the two-dimensional image data; and generate the first three-dimensional pose based on a mapping of the two-dimensional position of the contact between the ground plane and the foot of the first person to the first absolute three-dimensional position, the mapping based on the homographic matrix.

12. The system of claim 8, wherein one or more of the at least one processor circuit is to:

determine a difference between the first three-dimensional pose and the first root-relative three-dimensional pose regression; and generate, based on the difference, a third three-dimensional pose of the body parts associated with the first person.

13. The system of claim 8, wherein one or more of the at least one processor circuit to:

determine an image difference between a first image including the two-dimensional image data and a second image including second two-dimensional image data representing the first person and the second person; and generate, based on the image difference, a third three-dimensional pose of the body parts associated with the first person.

14. The system of claim 8, wherein one or more of the at least one processor circuit to:

identify a two-dimensional position of the contact between the ground plane and the foot of the first person;

generate a three-dimensional root position of the foot of the first person based on the homographic matrix; and generate the first three-dimensional pose based on a difference between the first absolute three-dimensional position and the three-dimensional root position of the foot of the first person.

15. An apparatus comprising:

means for generating two dimensional body part positions, the means for generating two dimensional body part positions to:

generate, based on two-dimensional image data representing a first person and a second person, first two-dimensional positions of body parts associated with the first person; and generate, based on the two-dimensional image data, second two-dimensional positions of body parts associated with the second person;

means for generating root-relative three-dimensional pose regression, the means for generating root-relative three-dimensional pose regression to:

generate, based on a deep neural network and the first two-dimensional positions, a first root-relative three-dimensional pose regression of the body parts associated with the first person; and generate, based on the deep neural network and the second two-dimensional positions, a second root-relative three-dimensional pose regression of the body parts associated with the second person;

means for identifying ground plane contact, the means for identifying ground plane contact to:

identify, based on the first two-dimensional positions and the first root-relative three-dimensional pose regression, contact between a ground plane and a foot of the first person; and identify, based on the second two-dimensional positions and the second root-relative three-dimensional pose regression, contact between the ground plane and a foot of the second person;

means for generating absolute three-dimensional ground contact positions, the means for generating absolute three-dimensional ground contact positions to:

generate a first absolute three-dimensional position of the contact between the ground plane and the foot of the first person; means for generating and generate a second absolute three-dimensional position of the contact between the ground plane and the foot of the second person; and means for generating poses, the means for generating poses to:

generate, based on the first absolute three-dimensional position, a first three-dimensional pose of the body parts associated with the first person; and generate, based on the second absolute three-dimensional position, a second three-dimensional pose of the body parts represented by the second person.

16. The apparatus of claim 15, including:

means for identifying two-dimensional positions of the ground plane based on the two-dimensional image data; and means for generating a homographic matrix to map the two-dimensional positions of the ground plane to three-dimensional positions of the ground plane, wherein the means for generating poses is to:

generate the first three-dimensional pose based on the homographic matrix, and generate the second three-dimensional pose based on the homographic matrix.

* * * * *